United States Patent
Kim et al.

(10) Patent No.: US 10,722,330 B2
(45) Date of Patent: Jul. 28, 2020

(54) DENTAL IMPLANT

(71) Applicant: DENFLEX CO., LTD, Seoul (KR)

(72) Inventors: Hyung Woo Kim, Goyang (KR); Gyun Hwan Kim, Goyang (KR)

(73) Assignee: DENFLEX CO., LTD, Seoul (KR)

( * ) Notice: Subject to any disclaimer, the term of this patent is extended or adjusted under 35 U.S.C. 154(b) by 0 days.

(21) Appl. No.: 15/568,647

(22) PCT Filed: Jun. 30, 2016

(86) PCT No.: PCT/KR2016/007063
§ 371 (c)(1),
(2) Date: Oct. 23, 2017

(87) PCT Pub. No.: WO2017/010711
PCT Pub. Date: Jan. 19, 2017

(65) Prior Publication Data
US 2018/0147037 A1 May 31, 2018

(30) Foreign Application Priority Data

Jul. 14, 2015 (KR) .......................... 10-2015-0099671

(51) Int. Cl.
*A61C 8/00* (2006.01)
*A61C 13/265* (2006.01)

(52) U.S. Cl.
CPC .............. *A61C 8/0062* (2013.01); *A61C 8/00* (2013.01); *A61C 13/265* (2013.01); *A61C 8/0022* (2013.01)

(58) Field of Classification Search
CPC ... A61C 13/265; A61C 8/0062; A61C 8/0022; A61C 8/0065; A61C 8/0057; A61C 8/00; A61C 8/0048; A61F 2002/305
See application file for complete search history.

(56) References Cited

U.S. PATENT DOCUMENTS

| 5,437,551 A * | 8/1995 | Chalifoux | A61C 8/0018 |
| | | | 433/172 |
| 5,782,918 A * | 7/1998 | Klardie | A61C 8/005 |
| | | | 433/172 |
| 6,227,859 B1 * | 5/2001 | Sutter | A61C 8/005 |
| | | | 433/173 |

FOREIGN PATENT DOCUMENTS

JP  2003-530952 A  10/2003
KR  10-2014-0063037 A  5/2014

(Continued)

*Primary Examiner* — Heidi M Eide
(74) *Attorney, Agent, or Firm* — Nathan & Associates; Menachem Nathan

(57) ABSTRACT

The present invention provides a dental implant including: a fixture and an abutment including a coupling leg, and the fixture and the abutment are elastically coupled with each other, the dental implant including: a fixture axial hole inner inclined surface in which an inner diameter of an axial hole is gradually and downwardly reduced from a predetermined position of an inner inclined surface of the fixture; a first coupling part formed with a coupling hole at a predetermined position of the fixture; and a first associated coupling part formed with a coupling protrusion complementarily coupled with the first coupling part, wherein when the first associated coupling part is separated from the first coupling part by rotating the abutment, the coupling protrusion upwardly pushes the abutment from the fixture by elastic repulsion with the axial hole inner inclined surface of the fixture, thus the abutment becomes separated from the fixture.

4 Claims, 7 Drawing Sheets

(56) References Cited

FOREIGN PATENT DOCUMENTS

| KR | 10-2014-179381 B1 | 5/2014 |
|----|-------------------|--------|
| KR | 10-2014-87606 B1 | 1/2015 |
| KR | 10-2015-0004560 A | 1/2015 |
| KR | 101728424 B1 | 5/2017 |
| WO | WO2017010711 A1 | 1/2017 |

\* cited by examiner

<A-A>

<B-B>

DENTAL IMPLANT

CROSS REFERENCE TO RELATED APPLICATIONS

This application is a 371 application for international patent application PCT/KR2016/007063 having the same title and is related to and claims priority from Korea Patent Application 10-2015-0099671 filed Jul. 14, 2015 which is incorporated herein by reference in its entirety.

TECHNICAL FIELD

The present invention relates to a dental implant fixing a dental prosthesis by forming an artificial tooth root that is coupled and implanted in the alveolar bone. More particularly, the present invention relates to a dental implant whereby an abutment is easily separated from a fixture of the dental implant, and vertical occlusal force applied thereto may be efficiently absorbed by improving a coupling structure between the fixture and the abutment.

BACKGROUND ART

In dentistry, an implant means an artificial tooth substituting for a lost natural tooth or a dental procedure that is conducted in such a manner that a fixture is implanted into a jawbone to be fused with the jawbone for a predetermined period, and prostheses such as a coupling member, artificial teeth, and the like are then fixed thereon so that the original functions of teeth can be recovered.

Although a typical prosthetic appliance or a typical false tooth damages surrounding teeth or bones according to the elapse of the time, an implanted tooth does not damage a surrounding tooth structure, and performs the function of an original tooth in the same shape as that of the original tooth. In addition, the implanted tooth is not decayed, so that the implanted tooth can be used for a long time.

Also, implants may facilitate the recovery of a single missing tooth and improve the function of an artificial tooth for a partially or completely edentulous patient, and may improve dental prosthesis recovery in terms of aesthetics. Furthermore, implants disperse an excessive stress applied on tissues of a support bone therearound, and contribute to stabilization of teeth in a row.

In the case of such an implant, a fixture implanted into a jawbone is coupled with a coupling part of an abutment with an upper axial hole of the fixture, and prosthesis is fixed on an upper part of the abutment.

In a conventional implant structure, a fixture and an abutment are thread-coupled, or a coupling hole of the fixture and a coupling protrusion of the abutment are elastically and complementarily coupled.

In a conventional thread-coupled structure, when a continuous load is repeatedly generated within the mouth as an implant wearer chews food, the screw coupling state becomes loose by being rotated since the screw slightly vibrates, and the oscillation width is gradually increased. Accordingly, a gap between the fixture and the abutment is generated. In other words, the artificial tooth shakes, thus the implant user may not easily chew the food, and undesirable mastication pressure may occur around the artificial tooth.

In addition, in the conventional implant structure, as described above, when coupling the abutment with the fixture, a thread-coupling may be performed while an accurate coupling position is not found. Accordingly, the artificial tooth and the alveolar bone may be damaged.

In addition, an implant unit having the above conventional implant structure has many difficulties in coupling the screw within a narrow oral cavity. Particularly, in the case of a patient whose surgical area is located on the back teeth side or who cannot widen his or her mouth widely, the implant procedure becomes more difficult.

As a conventional technique for solving such conventional problems, a dental implant of Korean Patent No. 10-0668368 has been proposed.

In the conventional technique, a dental implant includes: a fixture having an axial hole in an upper portion thereof and implanted into a jawbone; and an abutment having coupling legs made of a shape memory alloy, the legs being inserted into the axial hole of the fixture in a lower portion thereof and elastically coupled with the fixture so that teeth can be used to chew food. Herein, in the conventional technique, a coupling hole of the fixture formed with a concave form in an axial hole inner surface is formed in a vertical surface of the fixture inner surface.

Elastic coupling structures between the fixture and the abutment of the conventional technique have realized much technical advancement by effectively improving the thread-coupling problems. In addition, in actual use, it is very convenient to use since the coupling protrusion of the coupling leg is automatically and elastically coupled with the coupling hole of the fixture when the abutment is inserted within the fixture.

However, the above elastic coupling structures between the fixture and the abutment of the conventional technique cause inconvenience when separating the abutment from the fixture, and are not able to effectively perform buffer functions when vertical occlusal force is applied.

In other words, in order to separate the abutment from the fixture, the abutment is upwardly pulled with respect to the fixture by force such that the coupling protrusion or the coupling hole formed in the coupling leg is detached from the coupling hole or the coupling protrusion that is formed in the axial hole inner surface of the fixture in association by being upwardly pulled, or the abutment is separated from the fixture by rotating the abutment with respect to the fixture and upwardly pulling the fixture.

However, upwardly pulling the abutment with respect to the fixture by force as described above may apply large force to the alveolar bone of the patient through the fixture. As a result, there is great risk of damaging the alveolar bone of the patient due to excessive force. In addition, the associated coupling part and the coupling part which are configured with the coupling protrusion and the coupling hole formed in the abutment and the axial hole inner surface of the fixture become worn down due to repeated attachments and detachments, thus coupling force is reduced. Further, there is a problem in placing an extracting device that separates the abutment from the fixture by separating in a vertical direction, and which is disclosed in Korean Patent No. 10-1309417 and used when an upper surface of the fixture is deeply implanted in a gum.

As another coupling example, in an implant in which a coupling hole with a concave form is formed at positions spaced apart from each other at regular angles (for example, 90 degrees) along a circumferential direction from a predetermined vertical position of a fixture axial hole inner surface, and a coupling protrusion is complementarily formed in a lower part of the abutment in association with the coupling hole are formed (Korean Patent No. 10-0668368), when separating the abutment from the fixture, the abutment is separated from the fixture by rotating the abutment with respect to the fixture in a circumferential direction, separating the coupling protrusion of the abutment from the coupling hole formed in the fixture axial hole inner surface at a predetermined vertical position, and upwardly pulling the abutment from the fixture by force. Herein, sine the size of the implant is small, it is not easy to detect an accurate rotation amount so as to know how much to rotate and then pull it upwards. In some cases, there is a situation that it is re-fastened by being excessively rotated by giving too much power. Although a proper rotation is successfully performed, a considerable force must be applied again in the vertical direction. Further, an effective buffering function for vertical occlusal force may not be performed.

Accordingly, in order to prevent the above problems, it is preferable to use a structure in which a coupling part is separated without being re-coupled by the excessive rotation when the abutment is rotated with respect to the fixture in a circumferential direction or perimeter direction, and the abutment is separated from the fixture by upwardly pulling the abutment with less force. However, in the conventional technique, it is impossible to perform a natural separation process between the abutment and the fixture.

In addition, in the conventional technique described above, the operator may require a large force to upwardly pull the abutment with respect to the fixture y force, and such a procedure may act as a considerable mental burden on the implant procedure.

In addition, in the conventional technique described above, the implant structure may perform a buffer function for horizontal pressure, but a buffer function for vertical occlusion pressure may not be performed. Accordingly, there is a need for a structure that effectively performs a buffer function for vertical occlusion pressure. In addition, in the conventional technique described above, in order to separate the abutment from the fixture without damaging the fixture or the abutment, or the alveolar bone, an extraction device disclosed in Korean Patent No. 10-1309417 should be used. However, when the fixture is deeply implanted from the upper part of the alveolar bone, the extraction device may not be used.

Technical Problem

Accordingly, the present invention has been made keeping in mind the above problems occurring in the prior art, and an object of the present invention is to provide an improved dental implant in which an associated coupling part formed in a lower part of an abutment and a coupling part formed in an axial hole inner surface of a fixture in association with the associated coupling part are separated from each other with less force when separating the abutment from the fixture. In addition, although the abutment is rotated with excessive force, the fixture and the abutment are not re-coupled by being rotated again at a predetermined angle. Further, coupling force for performing a function of preventing a vertical directional separation in case of repeated attachments and detachments is not reduced, and the abutment is easily separated from the fixture by upwardly pulling the abutment with less force.

In addition, another object of the present invention is to provide an improved dental implant in which an operator may easily detect a separation state between the abutment and the fixture since the abutment is separated by being automatically and upwardly pushed from the fixture by rotating the abutment. Accordingly, the operator may procedure an implant procedure without difficulty and burdens.

In addition, another object of the present invention is to provide an improved dental implant in which a rotation with respect to rotation force equal to or less than a predetermined value within the axial hole of the fixture is prevented without adding an additional rotation prevention form in the coupling axial part of the abutment. Further, another object of the present invention is to provide an improved dental implant in which attachments and detachments between the fixture and the abutment are easily performed even though the fixture is deeply implanted from an upper part of an alveolar bone.

In addition, another object of the present invention is to provide an improved dental implant in which vertical occlusal force is effectively absorbed.

Hereinafter, for convenience of description, a function of preventing the abutment being rotated with respect to the fixture for rotation force equal to or less than a predetermined value is defined as "rotation prevention function", and a function of preventing the abutment being separated from the fixture in a vertical direction is defined as "vertical separation prevention function".

TECHNICAL SOLUTION

In order to accomplish the above object, the present invention provides a dental implant including a fixture forming an artificial tooth root by being implanted in an alveolar bone, and an abutment coupled with a prosthesis (crown or denture) at an upper part thereof wherein the upper part comprises an upper closed end, and provided at a lower part thereof with a coupling leg elastically coupled with an axial hole of the fixture by being elastically bent radially inwardly about a central axis and restoring an original shape thereof, the dental implant including: an inner inclined surface in which an inner diameter of an axial hole is gradually and downwardly reduced from a predetermined position of an axial hole inner surface of the fixture; a first coupling part formed as a coupling hole outwardly depressed at a predetermined position of the inclined surface; and a first associated coupling part formed on an outer surface of the coupling leg formed in the lower part of the abutment, and formed with a coupling protrusion complementarily coupled with the first coupling part formed in the axial hole inner inclined surface of the fixture, wherein a rotation prevention function is performed within rotation force equal to or less than a predetermined value by complementarily coupling the first coupling part and the first associated coupling part, and the coupling protrusion of the first associated coupling part is automatically separates the abutment from the fixture by upwardly pushing the abutment from the fixture by elastic repulsion between the inclined surface formed in the axial hole inner surface of the fixture when the abutment is rotated in a circumferential direction while the abutment is coupled within the fixture so that the first associated coupling part formed with the coupling protrusion is separated from the first coupling part formed with the coupling hole.

Preferably, when coupling the abutment with the fixture, the coupling hole formed in the inclined surface formed in the axial hole inner surface of the fixture may be formed with a coupling hole downwardly extending from the top of the inclined surface by a predetermined distance so that the coupling protrusion of the associated coupling part formed in the outer surface of the coupling leg of the lower part of the abutment may easily find a coupling hole position formed in the axial hole inner inclined surface of the fixture and a coupling position of the fixture and the abutment may be easily found. Herein, horizontal lengths in a circumstantial direction of the coupling protrusion of the associated coupled part formed in the outer surface of the coupling leg of the lower part of the abutment and the coupling hole of the coupling part formed in the axial hole inner inclined surface of the fixture should be identical. However, vertical lengths thereof may be identical or different.

Preferably, at least one first coupling part is formed on the axial hole inner inclined surface of the fixture along a circumstantial direction, and the abutment is coupled with the fixture only when the abutment is inserted into the fixture while arranging the abutment relative to the fixture at a predetermined angle.

Preferably, a surface in which the associated coupling part is formed may be formed to have an identical slope with a slope of the axial hole inner inclined surface of the fixture. When the fixture and the abutment are axially coupled, the coupling protrusion of the associated coupling part formed in the outer surface of the coupling leg of the lower part of the abutment is more outwardly protruded than the axial hole inner inclined surface that is positioned at the same vertical position.

More preferably, the coupling hole that is the first coupling part outwardly formed on the axial hole inner inclined surface of the fixture at a predetermined part may have a slope identical to a slope of the axial hole inner inclined surface of the fixture.

More preferably, the first coupling part is formed with a circular or non-circular coupling hole.

More preferably, an outer surface part of the coupling leg of the lower part of the abutment in which the first associated coupling part is formed may have a slope identical to a slope of the axial hole inner inclined surface of the fixture.

Most preferably, the dental implant further includes: a second associated coupling part that is formed with a holding protrusion in a lower or upper part of the first associated coupling part formed in the coupling leg of the lower part of the abutment to be protruded radially outwardly from the abutment so that performs a function of preventing a vertical separation; and a second coupling part formed with a holding portion inwardly formed on the axial hole inner surface of the fixture so that the second coupling part is coupled in association with the second associated coupling part, wherein when the first coupling part is coupled with the first associated coupling part, the second associated coupling part and the second coupling part are coupled at the same time so that coupling force in an axial direction between the abutment and the fixture is reinforced, and when the first associated coupling part is separated from the first coupling part by a rotation of the abutment, the coupling leg of the lower part of the abutment is elastically bent radially inwardly so that the second associated coupling part formed with the holding protrusion is automatically separated from the second coupling part formed in the axial hole inner surface of the fixture, thus the abutment is automatically and upwardly pushed by elastic repulsion between the coupling protrusion of the first associated coupling part and the shaft inner inclined surface, and the abutment and the fixture are separated from each other.

In addition, preferably, in the present invention, the associated surface of the abutment in which the first associated coupling part is formed may be formed to be associated with a surface in which the first coupling part is formed in the axial hole inner inclined surface of the fixture.

In the present invention, the first coupling part and the second coupling part may be formed in the inner inclined surface together, or only the first coupling part may be formed in the inner inclined surface of the axial hole of the fixture and the second coupling part may be formed in a vertical surface of the axial hole of the fixture. Meanwhile, the second coupling part that mainly performs a vertical separation prevention function may be formed with a ring-shaped holding portion in a concave form along the entire circumferential direction, or may be formed at positions spaced apart from each other at regular angles along the circumferential direction (for example, 90 degrees, 120 degrees, 180 degrees) as that of the first coupling part. In addition, positions of the first coupling part and the first associated coupling part which mainly perform a rotation prevention function, and the second coupling part and the second associated coupling part which mainly perform a vertical separation prevention may be vertically changed. However, herein, the coupling hole of the first coupling part of the axial hole inner inclined surface of the fixture which mainly performs a rotation prevention function should be formed on the axial hole inner inclined surface of the fixture.

In addition, in the present invention, functions of the first coupling part that mainly performs a rotation prevention function and the second coupling part that mainly performs a vertical separation prevention function may be may be integrated in the first coupling part formed on the axial hole inner inclined surface of the fixture to form a single coupling part. In other words, a coupling part formed with a coupling hole having a coupling portion may be formed in an inclined surface part formed in the axial hole inner surface of the fixture, and an associated coupling part formed with a coupling protrusion that is complementarily coupled with the coupling part of the fixture is formed in the lower part of the abutment. Accordingly, a single coupling part and a single associated coupling part in which vertical separation prevention and rotation prevention functions are performed at the same time, and the associated coupling part upwardly pushes the abutment by interworking with the inclined surface of the axial hole inner surface of the fixture when the abutment is rotated while being coupled.

In addition, in the present invention, the coupling protrusion formed in the abutment and the coupling hole formed in the axial hole inner inclined surface of the fixture may be interchanged from each other. For example, the associated coupling part of the abutment may be formed with a concave coupling hole, and the coupling part of the axial hole inner inclined surface of the fixture may be formed with a coupling protrusion in association thereof. Herein, the coupling hole formed in the coupling leg of the lower part of the abutment may be inwardly formed on the inner inclined surface with a diameter downwardly decreasing. In addition, in the present invention, installation holes may be formed in the upper part of the abutment as shown in FIG. 1 so that the abutment is easily rotated, a number of holes and positions thereof may be formed in association with a number of coupling legs of the lower part of the abutment and positions thereof.

Advantageous Effects

According to the present invention, the present invention includes a first associated coupling part that mainly performs a rotation prevention function is formed in a lower part of an abutment, and a first coupling part formed in an axial hole inclined surface of a fixture at a position that is in association with the first associated coupling part so that the first coupling part is complementarily coupled with the first associated coupling part.

Accordingly, according to the present invention, when separating the abutment from the fixture, the abutment and the fixture are easily separated by automatically and upwardly pushing the abutment from the fixture by elastic repulsion between the axial hole inner inclined surface of the fixture and a coupling protrusion of the first associated coupling part since the first associated coupling part is separated from the first coupling part when the abutment is rotated with respect to the fixture.

Accordingly, in the present invention, the abutment and the fixture are separated from each other with less force since the abutment is automatically and upwardly pushed when the abutment is rotated with respect to the fixture while the abutment and the fixture are coupled. Herein, the abutment may be easily separated from the fixture by being upwardly pulled with respect to the fixture. In addition, in the present invention, the abutment is not re-coupled with the fixture under excessive rotation since the abutment is automatically and upwardly pushed when the abutment is rotated with respect to the fixture.

In addition, according to the present invention, when separating the abutment from the fixture, the abutment is separated from the fixture, and is automatically and upwardly protruded when the abutment is rotated with respect to the fixture. Accordingly, the operator may easily detect a separation state between the abutment and the fixture. Thus, the implant procedure may easily and conveniently progress without difficulty and worry. In addition, according to the present invention, an additional polygonal form for a rotation prevention function is not provided to the abutment. In addition, according to the present invention, when vertical occlusal force is applied to the abutment, the inclined surface may effectively absorb vertical occlusal pressure.

In addition, according to the present invention, a coupling position between the fixture and the abutment may be easily found by forming a first coupling part for a rotation prevention which is formed with a coupling hole downwardly extending from the top of an inclined surface of the axial hole inner surface of the fixture in which the first coupling part is formed. Accordingly, when the abutment is coupled with the fixture by being inserted into the fixture axial hole, the first coupling part may guide a coupling protrusion of the associated coupling part which is formed in a coupling leg of a lower part of the abutment.

MODE FOR INVENTION

Hereinafter, preferred embodiments of the present invention will be described in detail with reference to the accompanied drawings.

Figure 1:
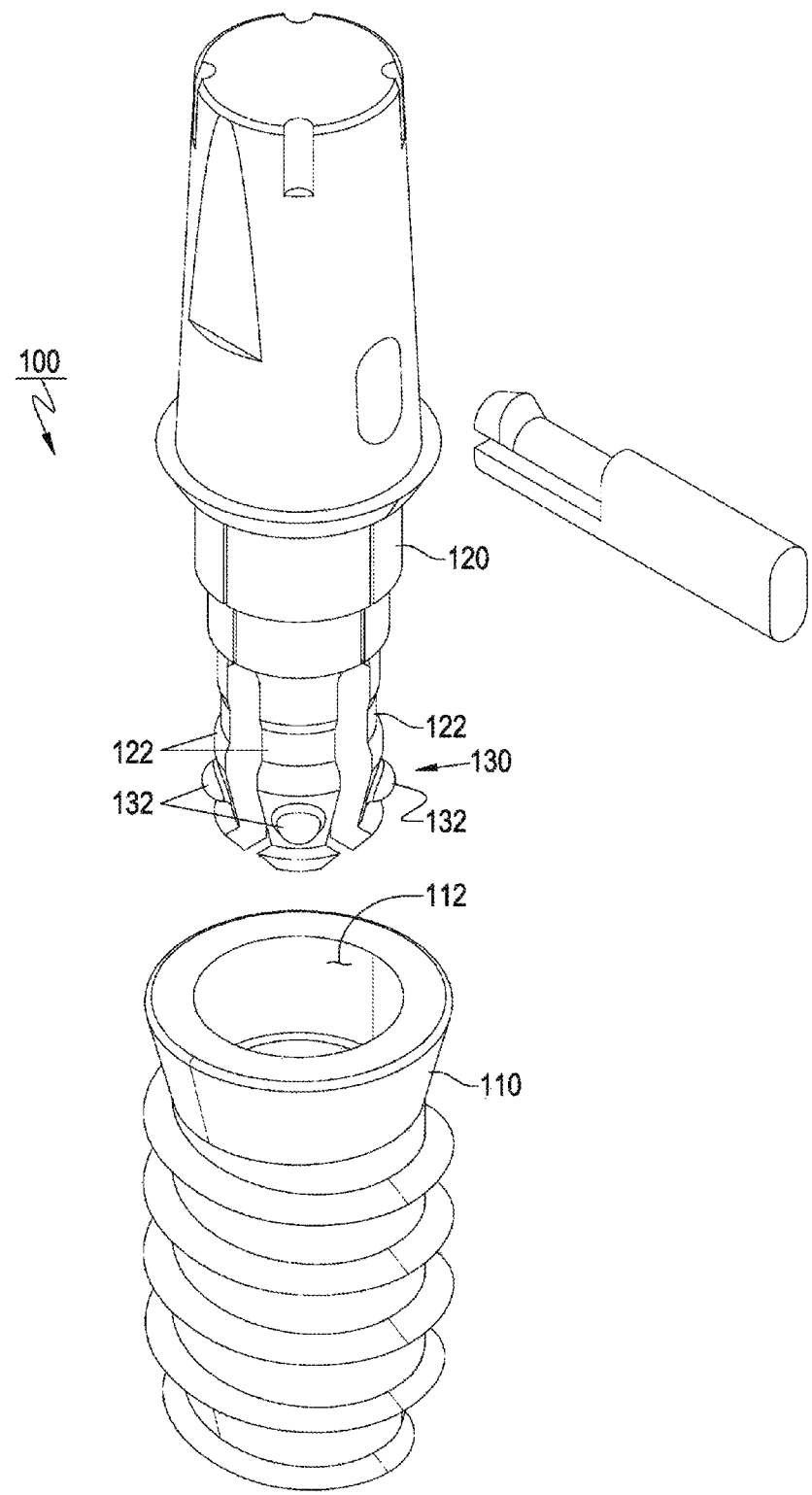
FIG. 1 is an external perspective view showing a coupling structure in which an abutment of a coupling leg type is coupled to a fixture in a dental implant according to the present invention.
Figure 2:
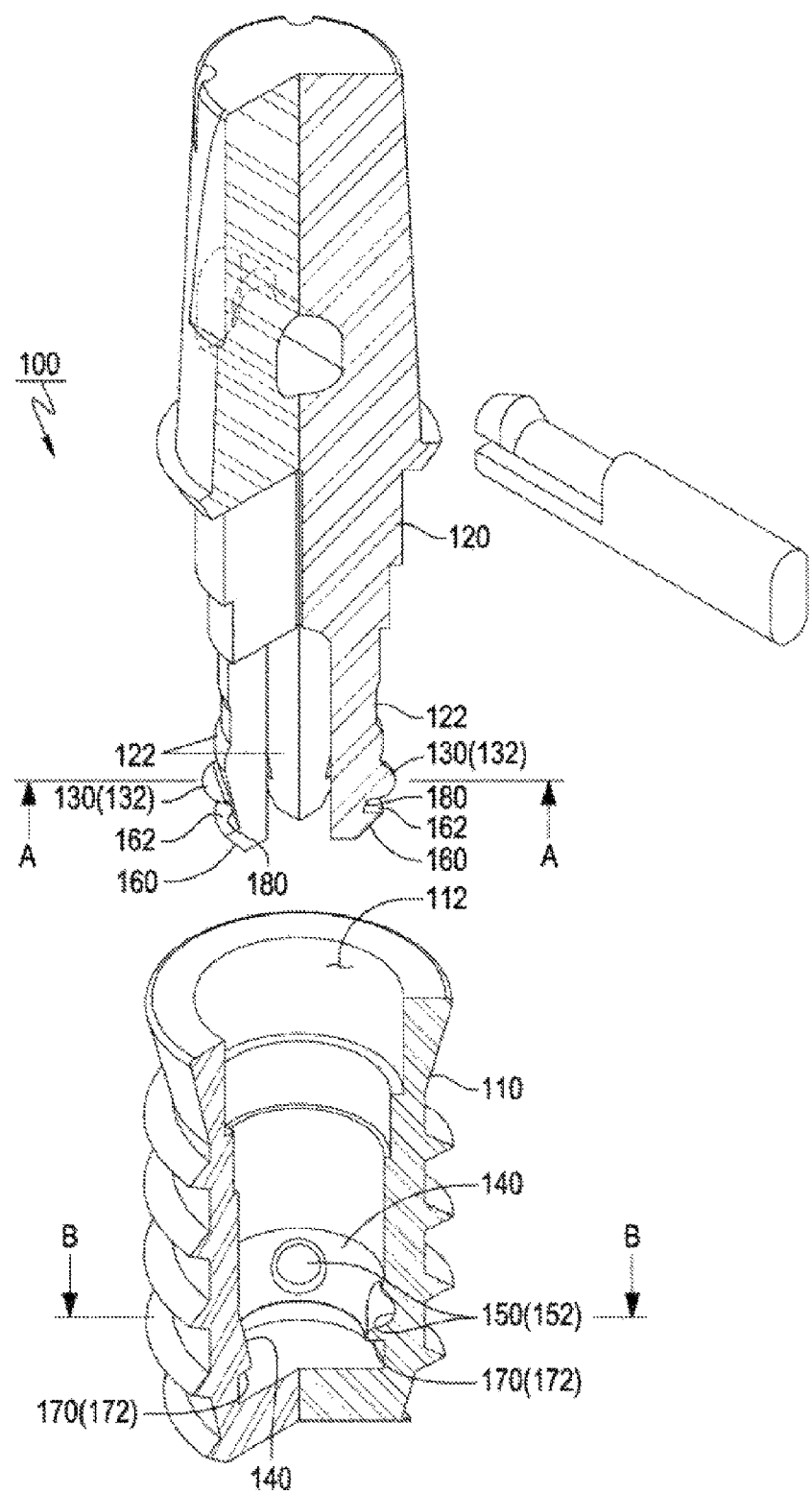
FIG. 2 is a longitudinal sectional view showing a dental implant according to the present invention.

According to the present invention dental implant 100 according to the present invention includes a fixture 110 forming an artificial tooth root implanted in an alveolar bone (not shown), and an abutment 120 coupled with the fixture 110 at a low part thereof and coupled with a prosthesis (crown or denture) at an upper part thereof. An implant procedure is performed by elastically and detachably coupling the fixture 110 and the abutment 120 as shown in FIG. 1 and FIG. 2.

The dental implant 100 according to the present invention is formed in at least one coupling leg 122 that is formed in a lower part of the abutment 120 and inserted into the fixture 110. The dental implant 100 includes a first associated coupling part 130 that mainly performs a rotation prevention function with respect to rotation force equal to or less than a predetermined value. The first associated coupling part 130 is formed with a circular coupling protrusion 132 on an associated inclined surface formed in a lower outer surface of each coupling leg 122. Herein, the associated inclined surface formed on the outer surface of the coupling leg that is formed in the lower part of the abutment may have or may not have an angle identical to an angle of an inclined surface formed in an axial hole inner surface of the fixture. In addition, the coupling protrusion may have a non-circular form. In other words, the coupling protrusion may have various forms in addition to the circular form. For example, the coupling protrusion may have a band-shaped protruding part by a predetermined distance along a circumferential direction.

Figure 3:
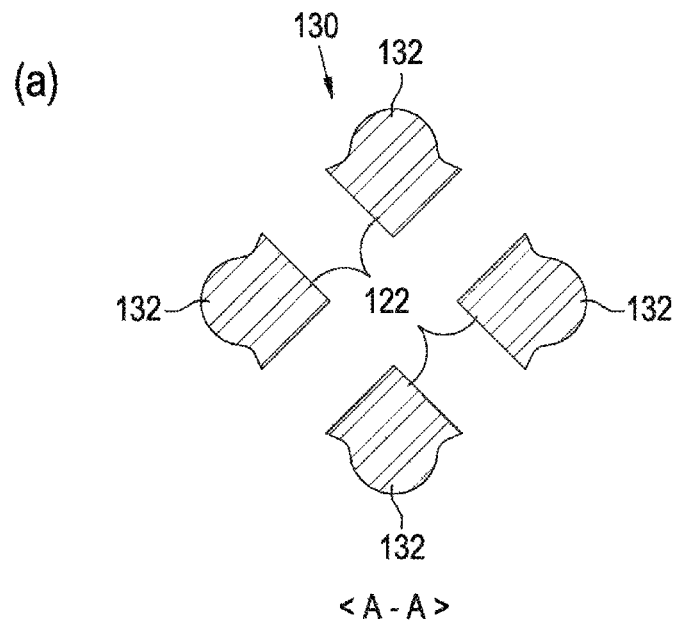
FIG. 3a is a sectional plan view of a first associated coupling part that performs a rotation prevention function in the dental implant according to the present invention, and is a sectional plan view of FIG. 2 along an A-A line.
FIG. 3b is a sectional plan view of a first coupling part that performs a rotation prevention function in the dental implant according to the present invention, and is a sectional plan view of FIG. 2 along a B-B line.
Figure 3:
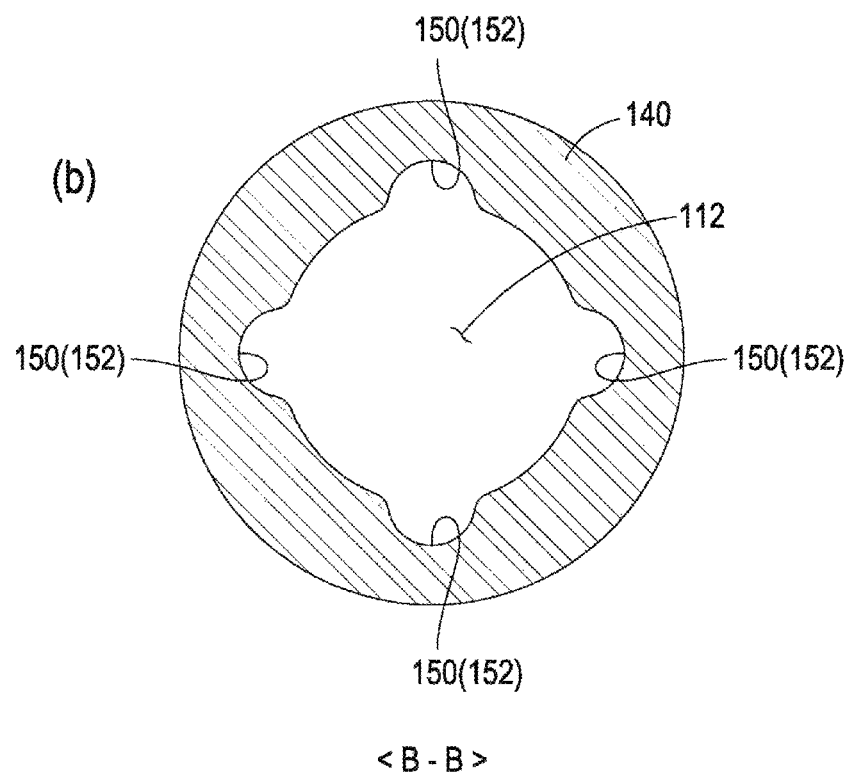

The first associated coupling part 130 that mainly performs a rotation prevention function with respect to the rotation force equal to or less than the predetermined value may be formed with, for example, a circular coupling protrusion 132 formed in each of four coupling legs 122 as shown in a sectional planar view of FIG. 3, or may be formed in a part of the coupling legs (not shown).

In addition, the dental implant 100 according to the present invention includes a fixture axial hole inner inclined surface 140 in which an inner diameter of an axial hole is gradually and downwardly reduced from a predetermined position in a vertical direction of an axial hole inner surface of the fixture.

In other words, the fixture axial hole inner inclined surface 140 has a cone structure with a wide top and a narrow bottom from a predetermined position towards a lower part of the axial hole inner surface of the fixture 110.

In addition, the dental implant 100 according to the present invention includes a first coupling part 150 that performs a rotation prevention function by being outwardly depressed on the fixture axial hole inner inclined surface 140 and complementarily coupled with the first associated coupling part 130. Herein, vertical lengths of the first associated coupling part and the first coupling part may be different. However, horizontal distances thereof in a circumferential direction should be identical within a numerical mechanical tolerance. Thereby, there will be no excessive micro-fluctuations for rotation force equal to or less than a predetermined value.

The first coupling part 150 may be formed with a circular coupling hole 152 that is complementarily coupled in association with the circular coupling protrusion 132 of the first associated coupling part 130 formed in the inclined surface 140. Herein, a form of the coupling hole or the coupling protrusion may vary, and a form of each first associated coupling part formed in each coupling leg may not be identical. Accordingly, a form of a first coupling part complementarily coupling with the first associated coupling part may be different.

In addition, in order to easily find a coupling position of the fixture and the abutment, the first coupling part may be formed with a coupling hole downwardly extending from the top of the inclined surface. Herein, the coupling hole of the first coupling part and the coupling protrusion of the first associated coupling part may be identical within a numerical error of machining so that the coupling hole of the first coupling part and the coupling protrusion of the first associated coupling part may be coupled in a female and male type. However, vertical lengths of the coupling hole and the coupling protrusion may not be identical.

The first coupling part 150 that mainly performs a rotation prevention function may be formed with, for example, four circular coupling holes 152 associated with respective first associated coupling parts 130 formed with four circular coupling protrusions 132 as shown in a sectional planar view of FIG. 3*b*.

Hereinafter, with reference to the figure, a structure in which the first associated coupling part 130 is formed with a circular coupling protrusion 132, and a first coupling part 150 is formed with a circular coupling hole 152 coupled in association with the circular coupling protrusion 132 of the first associated coupling part 130 will be described in detail. Persons skilled in the art may easily know that an identical coupling and separating process may be applied to a structure in which the first associated coupling part 130 is formed with a circular coupling hole (not shown), and the first coupling part 150 is formed with a circular coupling protrusion (not shown) that is coupled in association with the circular coupling hole. The present invention should be construed to include both structures.

In addition, the present invention may additionally include a second associated coupling part 160 that is protruded radially outwardly from the abutment 120 and formed in a lower part or an upper part of the first associated coupling part 130, and mainly performs a vertical separation prevention function.

In addition, in the present invention, the first coupling part and first associated coupling part may additionally perform functions of a second coupling part and the second associated coupling part.

In the second associated coupling part 160 that mainly performs a vertical separation prevention function, as shown in FIG. 2, an upper sectional surface of a coupling protrusion protruding radially outwardly from the abutment 120 forms a coupling planar surface 162 of the second associated coupling part, and a longitudinal sectional surface of the second associated coupling part that mainly performs a vertical separate prevention function by the coupling protrusion may be formed with a sectional surface in which a radius thereof is downwardly reduced.

In addition, in the axial hole inner surface of the fixture, a second coupling part 170 that is formed with a holding portion with a concave shape formed radially inwardly, and which is coupled in association with the second associated coupling part 160 may be further included.

In addition, the first coupling part and the second coupling part may be integrated and configured in a single coupling part.

The second coupling part 170 formed with the holding portion as described above has a structure that includes a coupling planar surface 172 of the second coupling part which is associated with the coupling planar surface 162 of the second associated coupling part 160 that mainly performs a vertical separation prevention function. In addition, an angle formed where the coupling planar surface of the second coupling part and the coupling planar surface of the second associated coupling part meet a vertical central axis 1 may vary.

The second associated coupling part 160 and the second coupling part 170 as described above, as shown in FIG. 4*a*, become automatically separated from each other since the coupling leg 122 is elastically bent radially inwardly when the first associated coupling part 130 is detached and separated from the first coupling part 150.

Figure 4:
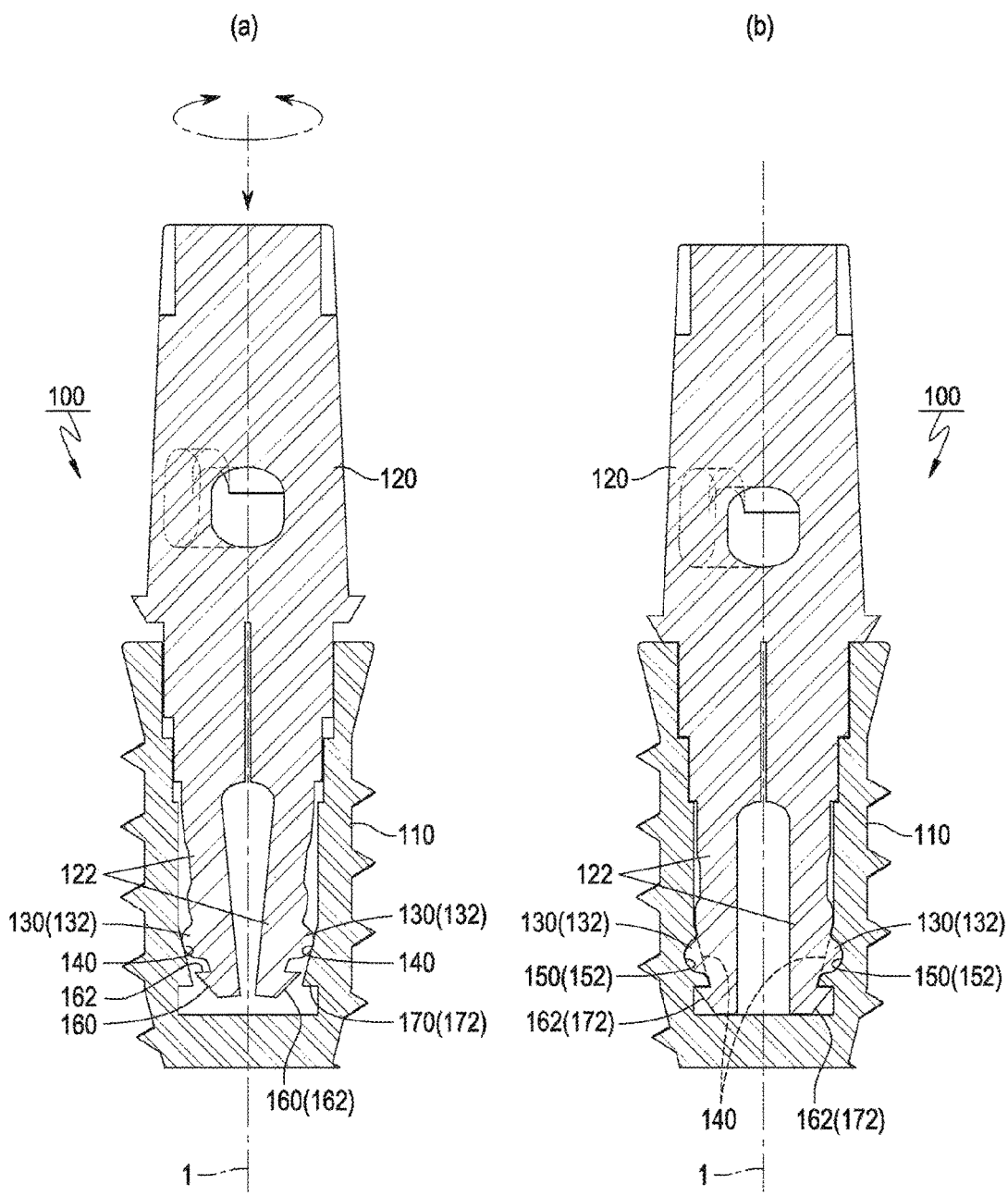
FIG. 4a is a longitudinal sectional view showing a coupling intermediate state between the abutment and the fixture in the dental implant according to the present invention.
FIG. 4b is a longitudinal sectional view showing a coupled state between the abutment and the fixture in the dental implant according to the present invention.

However, when the first associated coupling part 130 and the first coupling part 150 are coupled, as shown in FIG. 4*b*, the second associated coupling part 160 and the second coupling part 170 are simultaneously coupled so that axial directional coupling force between the abutment 120 and the fixture 110 is reinforced. Accordingly, the second associated coupling part and the second coupling part which mainly perform a vertical separation prevention function may maintain vertical separation prevention coupling force without any damage during repeated detachments.

In addition, the first associated coupling part 130 formed with the coupling protrusion 132 is formed on an associated inclined surface 180 formed in a lower outer surface of each coupling leg 122, and coupled in association with the coupling hole 152 of the first coupling part 150.

The associated inclined surface 180 of the coupling leg 122 in which the first associated coupling part 130 is formed may be formed to have a slope identical to a slope of the inclined surface 140 of the axial hole of the fixture 110 in which the first coupling part 150 is formed.

Figure 5:
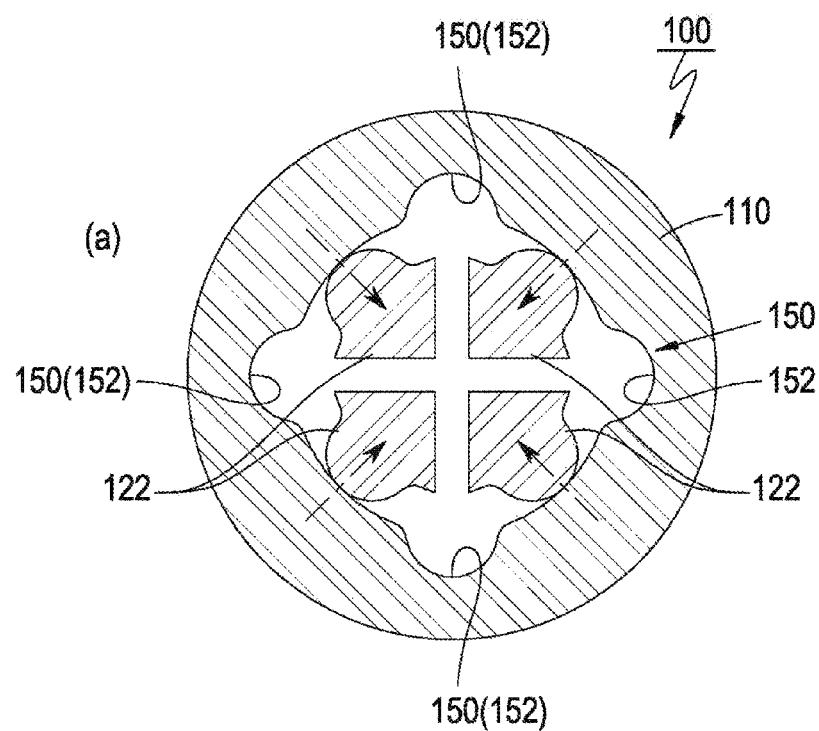
FIG. 5a is a sectional planar view showing an intermediate coupling process between the abutment and the fixture in the dental implant according to the present invention.
FIG. 5b is a sectional planar view showing a coupled state between the abutment and the fixture in the dental implant according to the present invention.
Figure 5:
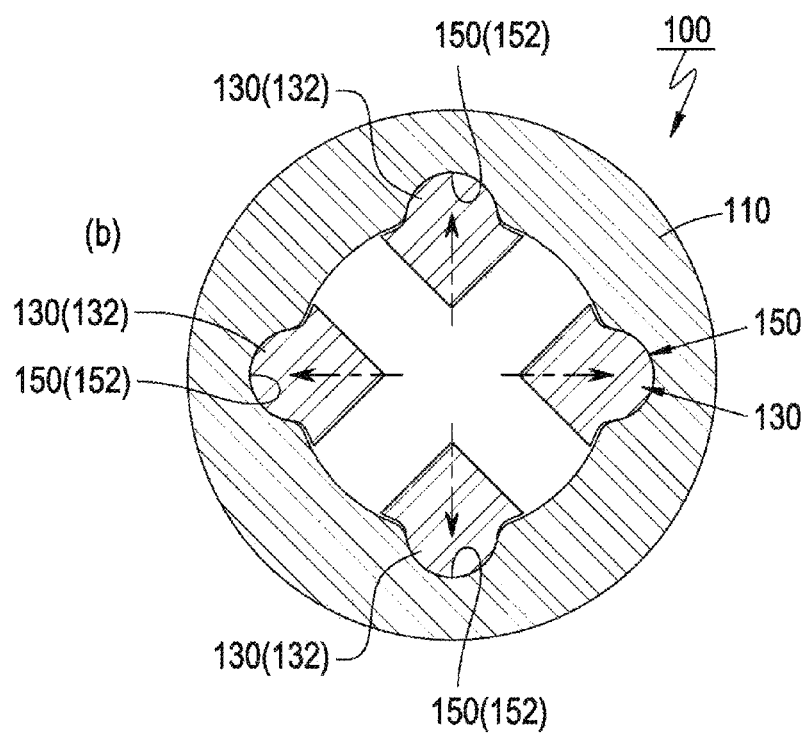

In the dental implant 100 of the present invention configured as above, the abutment 120 is completely pushed into an axial hole 112 of the fixture 110 as shown in FIG. 4*a* and FIG. 5*a*, and the abutment 120 is rotated in a circumferential direction in order to couple the abutment 120 with the fixture 110.

Accordingly, the circular coupling protrusion 132 of the first associated coupling part 130 formed in each coupling leg 122 of the abutment 120 is coupled in association with the circular coupling hole 152 of the first coupling part 150 formed on the inclined surface 140 of the fixture 110 as shown in FIG. 4b and FIG. 5b.

Alternatively, in order to separate the abutment 120 from the fixture 110 while the abutment 120 and the fixture 110 are coupled, the abutment 120 is rotated in a circumferential direction within the fixture 110.

Figure 6:
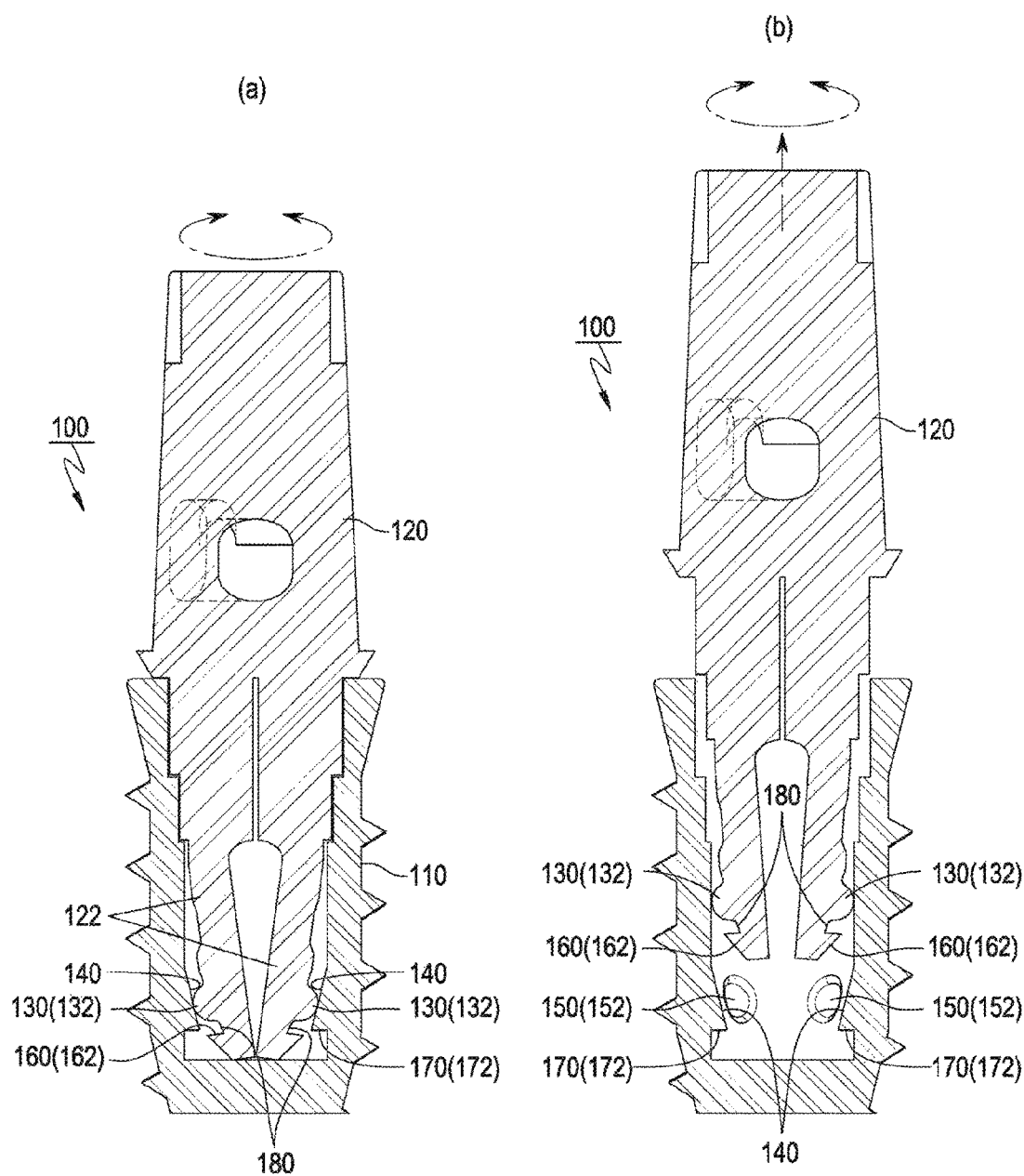
FIG. 6a is a longitudinal sectional view showing a decoupling intermediate process between the abutment and the fixture in the dental implant according to the present invention.
FIG. 6b is a longitudinal sectional view showing a state in which the abutment is automatically and upwardly pushed from the fixture since the first associated coupling part that mainly performs a rotation prevention function is lifted up by the inclined surface of the fixture in the dental implant according to the present invention.
Figure 7:
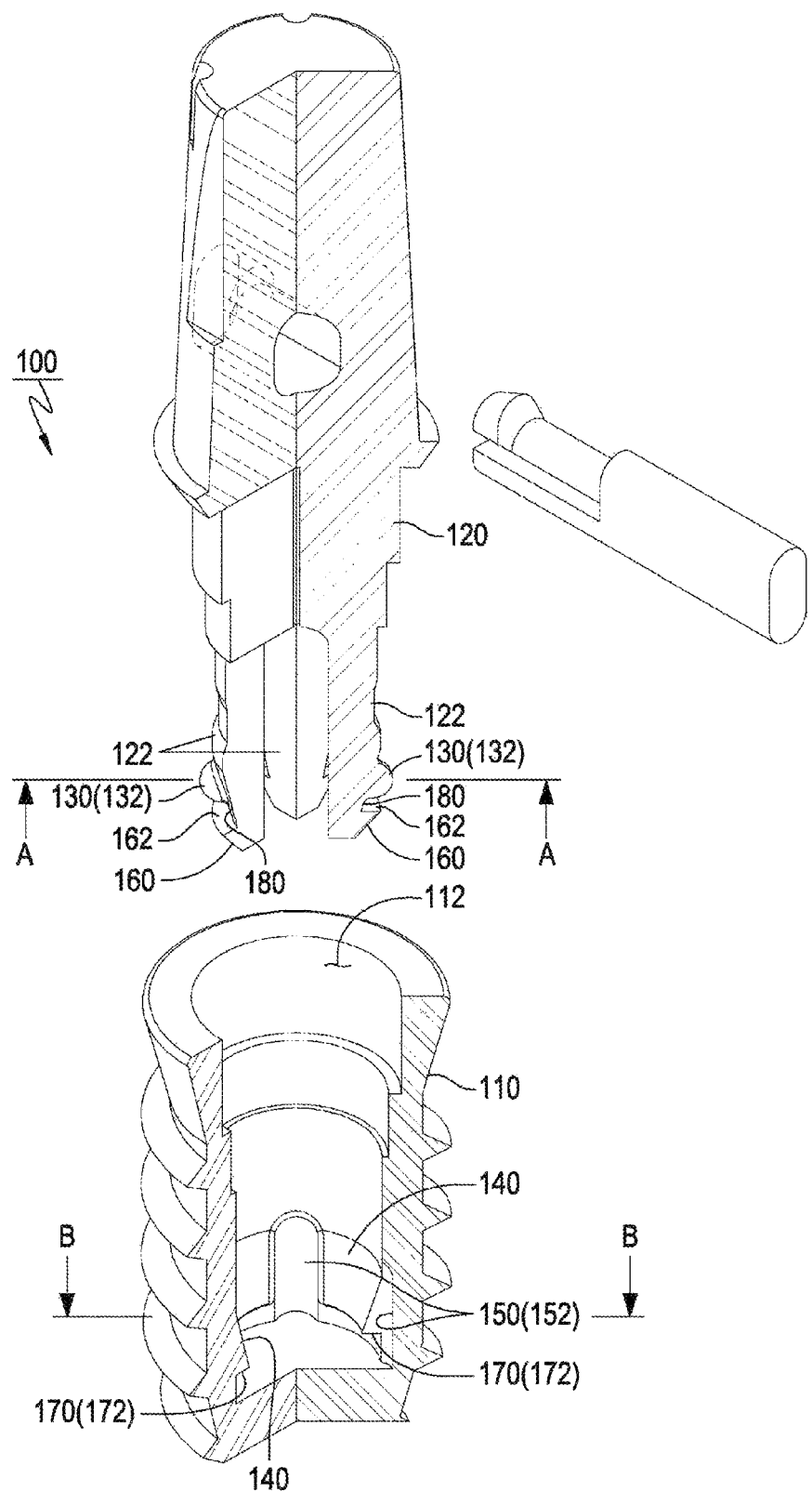
FIG. 7 is a longitudinal sectional view showing a structure of a coupling hole downwardly extending from the top of a fixture axial hole inner inclined surface according to another embodiment of the present invention.

The above state is shown in FIG. 6a. In other words, in the dental implant 100 of the present invention, the first associated coupling part 130 comes out and is separated from the first coupling part 150 in a circumferential direction by rotating the abutment 120 in a circumferential direction while the abutment 120 is coupled within the fixture 110. At the same time, the second associated coupling part 160 that mainly performs a vertical separation prevention function automatically comes out from the second coupling part 170.

Accordingly, when the first associated coupling part 130 that mainly performs a rotation prevention function of the abutment in a circumferential direction with respect to the abutment is rotated in a circumferential direction and separated from the first coupling part 150 by rotation force equal to or greater than a predetermined value, and the second associated coupling part 160 that mainly performs a vertical separation prevention function is come out from the second coupling part 170, the coupling leg 122 is inwardly bent (direction in an inner diameter), thus the coupling protrusion of the first associated coupling part 130 pushes against the axial hole inner inclined surface 140 of the fixture 110 by elastic restoring force.

Accordingly, the first associated coupling part 130 is upwardly slipped in the fixture axial hole inner inclined surface 140, and upwardly pushes the abutment 120 from the fixture 110 as shown in FIG. 6b, thus the abutment 120 and the fixture 110 become separated.

As described above, according to the present invention, when separating the abutment 120 from the fixture 110, the abutment 120 is easily separated from the fixture 110 since the first associated coupling part 130 is separated from the first coupling part 150 when the abutment 120 is rotated with respect to the fixture 110, and the abutment 120 is upwardly pushed from the fixture 110 by elastic repulsion with the inclined surface 140.

Accordingly, in the present invention, the abutment 120 may be separated from the fixture 11 with less force, whereby a large pulling force may not be applied to an alveolar bone of a patient as in the past. In addition, a decrease in vertical separation prevention coupling force of the abutment with respect to the fixture does not occur when the abutment is repeatedly attached to and detached from the fixture. Further, the abutment is not re-coupled with the fixture although a rotation amount is large since the abutment is automatically and upwardly pushed when the first associated coupling part is separated from the first coupling part.

As described above, according to the present invention, it is possible to minimize the risk of injury to the patient during the implant procedure, and an operator may easily determine a separation state between the abutment 120 and the fixture 110 since the abutment 120 is automatically pushed up from the fixture 110. Accordingly, an implant operator may easily and conveniently progress the procedure without difficulty and worry.

Although embodiments have been described with reference to a number of illustrative embodiments thereof, it is to be understood that the invention is not limited to this specific structure. Rather, modifications and changes will be apparent to a person having ordinary skill in the art without departing from the principle of the invention defined in the following claims. For example, strong rotation force may be applied to the fixture by forming a polygonal form in the axial hole inner surface of the fixture or a lower part thereof when implanting the fixture in the alveolar bone. For example, a single coupling part in which functions of the first coupling part and the second coupling part are integrated may be formed. Herein, the structure, that is configured to enable easy separation of the abutment from the fixture by contacting the associated coupling part formed in the lower part of the abutment with the axial hole inner inclined surface formed in the axial hole inner surface of the fixture, and by upwardly pushing the abutment by elastic repulsion when the abutment is rotated while the abutment is coupled with the fixture is not changed. In addition, forms of the first coupling part and the first associated coupling part that mainly performs a rotation prevention function and the first associated coupling part may be not associated 100%. In other words, although the forms of the first coupling part와 first associated coupling part do not complementarily associate 100%, it is only necessary to be able to perform a rotation prevention function for rotation force equal to or less than a predetermined value. As another example, both of the first and second associated coupling parts may not be formed in the coupling leg. In other words, the first and second associated coupling parts may be formed in a part of the coupling legs. As another example, the first coupling part or the first associated coupling part which are circular may have various forms other than a circular form. In addition, four coupling legs 122 are formed in the example of the figure. However, one to six or more coupling legs 122 may be formed, and the first associated coupling part 130 may be formed in each coupling leg 122. In association with this, the first coupling part 150 may be formed. In addition, the second coupling part may have various coupling angles and forms depending on the vertical central axis. In other words, the planar surface of the second associated coupling part may be formed to have a gradual angle rather than the planar surface. In addition, as another example, the inclined surface in which the first coupling part is formed may be formed in a stepped form rather than a continuous surface. Meanwhile, whichever coupling method in which the abutment is coupled with the fixture, as the method in which the coupling protrusion and the coupling hole are elastically coupled with each other by elastic repulsion thereof, it should be construed that the structure, in which the abutment and the fixture are easily separated by upwardly pushing the abutment from the fixture by elastic repulsion between the coupling protrusion of the associated coupling part formed in the lower part of the abutment and the inclined surface formed in the axial hole inner surface of the fixture when the abutment is rotated while the abutment is coupled with the fixture, is included in the scope of the present invention. In other words, it should be construed that all cases in which the first coupling part formed with the coupling hole in the inclined surface of the axial hole inner surface of the fixture and which is elastically coupled with the abutment is included, and the abutment and the fixture are easily separated from each other, by upwardly pushing the abutment from the fixture by elastic interaction between the inclined surface of the axial hole inner surface of the fixture and the first associated coupling part formed in the lower part of the abutment when the abutment is rotated with respect to the fixture while the abutment and the fixture are coupled with each other since the first associated coupling part is formed in the abutment in association with the first coupling part are included in the scope of the present invention. In addition, a simple design modification including technical characteristic of the present invention may be included within the spirit and scope of the present invention.

DESCRIPTION OF REFERENCE NUMERALS

100: dental implant
110: fixture
112: axial hole
120: abutment
122: coupling leg
130: first associated coupling part
132: circular coupling protrusion
140: fixture axial hole inner inclined surface
150: first coupling part
142: coupling hole
160: second associated coupling part
162: coupling planar surface of second associated coupling part
170: second coupling part
172: coupling planar surface of second coupling part couple
180: associated inclined surface
1: vertical central axis

The invention claimed is:

1. A dental implant, comprising:
a) a fixture comprising an axial hole with an inner inclined surface in which an inner diameter of the axial hole is gradually and downwardly reduced from a predetermined position in the inner inclined surface, wherein the inner inclined surface includes a first coupling part in the form of a circular coupling recess along a circumferential direction;
b) an abutment comprising an upper part for coupling with a prosthesis, and a lower part below the the upper part, the lower part comprising at least one coupling leg that includes on an outer surface thereof a first associated coupling part with a respective coupling protrusion;
wherein the abutment is fixedly attached to the fixture when the coupling protrusion is elastically coupled to the circular coupling recess such that the fixedly attached abutment is prevented solely by elastic coupling from rotating relative to the fixture in a circumferential direction when a rotation force applied to the fixedly attached abutment has less than a predetermined value, and
wherein the fixedly attached abutment is separable from the fixture when a rotation force equal to or greater than the predetermined value is applied to the fixedly attached abutment to rotate the fixedly attached abutment in the circumferential direction to separate the coupling protrusion from the circular coupling recess.

2. The dental implant of claim 1, wherein the first coupling protrusion is a circular coupling protrusion on an associated inclined surface formed in a lower outer surface of the at least one coupling leg, and wherein the at least one coupling leg is elastically bendable radially inwardly to enable the separation of the coupling protrusion from the circular coupling recess.

3. The dental implant of claim 2, wherein the fixture further comprises a second coupling part at a bottom section of the axial hole,
wherein the abutment further comprises a second associated coupling part at a top section of the at least one coupling leg,
wherein the second coupling part is engaged with the second associated coupling part when the coupling protrusion is elastically coupled to the circular coupling recess, and
wherein the second coupling part is disengaged from the second associated coupling part when the coupling protrusion is separated from the circular coupling recess, the disengagement of the second coupling part from the second associated coupling part enabling vertical extraction of the fixedly attached abutment from the fixture.

4. The dental implant of claim 1, wherein the fixture further comprises a second coupling part at a bottom section of the axial hole,
wherein the abutment further comprises a second associated coupling part at a top section of the at least one coupling leg,
wherein the second coupling part is engaged with the second associated coupling part when the coupling protrusion is elastically coupled to the circular coupling recess, and
wherein the second coupling part is disengaged from the second associated coupling part when the coupling protrusion is separated from the circular coupling recess, the disengagement of the second coupling part from the second associated coupling part enabling vertical extraction of the fixedly attached abutment from the fixture.

* * * * *